United States Patent [19]

Lemahieu et al.

[11] 4,288,534
[45] Sep. 8, 1981

[54] PHOTOGRAPHIC SILVER HALIDE MATERIALS CONTAINING LIGHT-ABSORBING DYES

[75] Inventors: Raymond G. Lemahieu; Henri Depoorter; Emiel A. Hofman, all of Mortsel, Belgium

[73] Assignee: Agfa-Gevaert, N.V., Mortsel, Belgium

[21] Appl. No.: 121,737

[22] Filed: Feb. 15, 1980

[30] Foreign Application Priority Data

Mar. 2, 1979 [GB] United Kingdom ............... 07439/79

[51] Int. Cl.³ ............................................. G03C 1/84
[52] U.S. Cl. .................................. 430/522; 432/510; 430/595; 542/444
[58] Field of Search .................. 430/522, 595, 510; 542/444

[56] References Cited

U.S. PATENT DOCUMENTS

| 3,441,563 | 4/1969 | Weissel et al. ............... 542/444 |
| 3,512,983 | 5/1970 | Watanabe et al. ............ 430/522 |
| 3,647,460 | 3/1972 | Hofman et al. ............... 96/66 |
| 3,865,817 | 2/1975 | Kobayashi et al. ............ 430/522 |
| 3,876,429 | 4/1975 | Poppe et al. .................. 430/522 |

FOREIGN PATENT DOCUMENTS 2026252 3/1970 Fed. Rep. of Germany.
1243180 8/1971 United Kingdom.

Primary Examiner—Jack P. Brammer
Attorney, Agent, or Firm—A. W. Breiner

[57] ABSTRACT

For absorbing light of the whole visible spectral region in a silver halide emulsion layer or in an antihalation layer of a photographic material it suffices to use a 2-pyrazolin-5-one pentamethine oxonol dye corresponding to the formula:

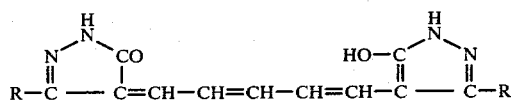

wherein R is a $C_1$–$C_5$ alkyl group.

The dyes are used in dispersed form in at least one light-sensitive silver halide emulsion layer or in an antihalation layer.

6 Claims, 1 Drawing Figure

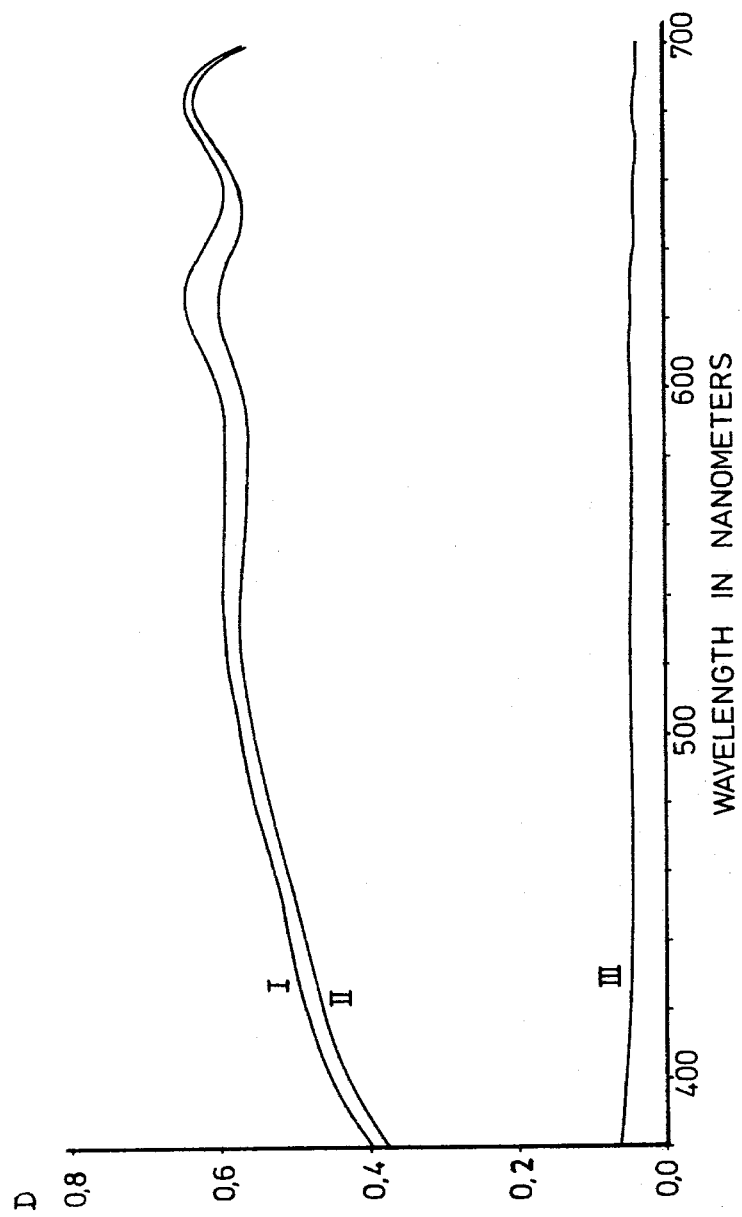

PHOTOGRAPHIC SILVER HALIDE MATERIALS CONTAINING LIGHT-ABSORBING DYES

The present invention relates to photographic light-sensitive silver halide materials comprising a light-absorbing dye absorbing light of the whole visible region of the spectrum.

It is known to incorporate for many purposes light-absorbing dyes into photographic materials. Such light-absorbing dyes can be used as filter dye in a layer coated over one or more light-sensitive emulsion layers or between two emulsion layers e.g. differently colour-sensitized emulsion layers, to protect the underlying light-sensitive emulsion layer(s) from the action of light of a wavelength range absorbed by such light-absorbing dye; as screening dye in a light-sensitive emulsion layer itself; or as antihalation dye in a layer not containing a light-sensitive substance and known as antihalation layer, situated on any of the sides of the support carrying the light-sensitive emulsion layer(s).

The spectral absorption range of the screening and antihalation dyes used should correspond to the spectral sensitivity range of the light-sensitive emulsion for which they are used. For panchromatically sensitized emulsion layers it is common practice to use in antihalation layers or in said emulsion layers a combination of dyes so chosen as to absorb light of the whole visible region of the spectrum. To obtain as much as possible a uniform absorption within this region multiple dyes with different absorption ranges are used.

Apart from the fact that for these purposes it may be difficult to match the individual absorption characteristics of the dyes, each of the dyes used should meet the specific requirements for their use in photographic elements e.g. they should not affect the inherent sensitivity or spectral sensitization of the light-sensitive emulsions, with which they may come into contact, they should not give rise to fogging, and they should be readily rendered ineffective e.g. decolourized or destroyed and removed in one of the processing stages. Moreover the use of a multiplicity of dyes poses problems of compatibility and may give rise to coating deficiencies.

Among the light-absorbing dyes that have been proposed for use in photographic materials the pyrazolone-oxonols are well known representatives. In the Belgian Pat. No. 850,162 filed Jan. 16, 1976 by Agfa-Gevaert N. V., the use is described in photographic layers of a combination of a bis(1-p-carboxyphenyl-3-methyl-2-pyrazolin-5-one) monomethine oxonol dye and a pentamethine oxonol dye, the said combination providing uniform absorption over the whole visible spectral region. However, the blue pentamethine oxonol leaves some residual staining in the material after processing and the yellow monomethine oxonol decolourizes too slowly in weakly alkaline developing solutions thus staining these solutions.

In accordance with the present invention, for absorbing light of the whole visible spectral region, more particularly of the region from about 380 nm to about 700 nm, in a silver halide emulsion layer or in an antihalation layer of a photographic material, it is possible to use a novel 2-pyrazolin-5-one oxonol dye, which corresponds to the following formula:

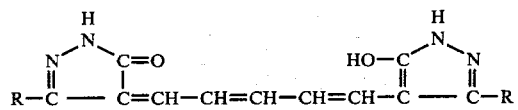

wherein R represents a ($C_1$–$C_5$) alkyl group e.g. methyl, ethyl and tert-butyl.

The fact that in accordance with the invention one dye suffices to cover the whole region of the visible spectrum, highly reduces the risk of coating difficulties and desensitizing effects.

Moreover, the dyes according to the invention are readily prepared at low cost.

In alkaline processing baths e.g. a developing solution the dyes used according to the invention are readily decomposed and removed leaving no residual colour whatsoever in the light-sensitive material, even when they were present in an antihalation layer between the support and an emulsion layer. The processing baths too do not become stained.

For providing uniform absorption over the whole visible region of the spectrum, the dyes according to the invention are employed in dispersed form. In the dispersed insoluble state the dyes used according to the invention are non-diffusing in hydrophilic colloid layers and thus they need not be mordanted by means of mordanting agents, as is usual with water-soluble dyes in salt form. Indeed, such dyes are highly diffusing.

The present invention thus provides a photographic material comprising a support and at least one light-sensitive silver halide emulsion layer wherein (the) emulsion layer(s) or an antihalation layer coated on either side of the support comprise in dispersed state therein a dye as defined above.

Representative examples of pentamethine oxonol dyes according to this invention are:

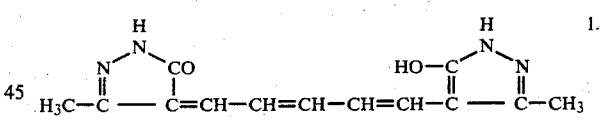

bis-1,5-(3-methyl-2-pyrazolin-5-one)-pentamethine oxonol

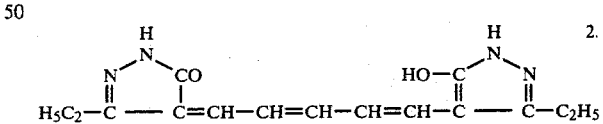

bis-1,5-(3-ethyl-2-pyrazolin-5-one)-pentamethine oxonol

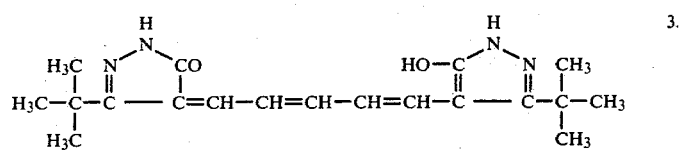

bis-1,5-(3-tert-butyl-2-pyrazolin-5-one)-pentamethine oxonol.

The above pentamethine oxonol dyes are prepared as described in the preparations hereinafter.

Preparation 1: dye 1

In a 10 l flask 2500 ml of water and 1300 g (10 mole) of ethyl acetoacetate were stirred at room temperature. 641 g (12 mole) of hydrazine hydrate was added dropwise with continuous stirring to the uncooled mixture. The reaction was exothermic and finally the mixture boiled. After the addition the stirring was continued for 30 min. After 5 min. the products started crystallizing. The mixture was left at room temperature overnight and continued crystallizing. The pyrazolone derivative was sucked off and washed with 3 l of ethanol. After drying 800 g of white crystalline product melting at 220° C. (Kofler) were obtained. An amount of 540 g of this white product (5.5 mole), 710 g (2.5 mole) of N,N'-1,3-pentadiene-1-yl-5-ylidene dianiline monochlorohydrate, and 5 l of ethanol were stirred for 5 min at room temperature in a flask, whereupon 2800 ml (20 mole) of triethylamine were added. Stirring was continued for 1 hour at room temperature. Subsequently, the reaction mixture was poured out in a mixture of 25 l of water and 2250 ml (25 mole) of concentrated hydrochloric acid, which mixture had been heated previously to 55° C. The resulting mixture was left standing overnight at room temperature. Afterwards the product was filtered with suction, rinsed twice with 10 l of 0.01 N hydrochloric acid at 55° C., and dried. Yield: 458 g of dye 1. Absorption max.: 650 nm. $\epsilon = 1.15 \times 10^5$ in a solvent mixture of 1000 ml of dimethylsulfoxide and 2 ml of triethylamine.

Preparation 2: dye 2

26.7 g (0.48 mole) of hydrazine hydrate (93.6%) were added dropwise with stirring to a mixture of 120 ml of water and 55.6 g (0.4 mole) of ethyl acetopropionate. The reaction was exothermic so that the temperature rose to approximately 70° C. After 2 minutes a precipitate started forming. Stirring was continued for another hour. The reaction mixture was left cooling overnight. The 3-ethyl-2-pyrazolin-5-one was filtered with suction and rinsed with water. After drying 33 g (71%) of product melting at 194° C. were obtained.

12.4 g (0.11 mole) of 3-ethyl-2-pyrazolin-5-one and 14.2 g (0.05 mole) of N,N'-1,3-pentadiene-1-yl-5-ylidene dianiline monochlorohydrate were stirred in 150 ml of ethanol. After the addition of 56 ml (0.4 mole) of triethylamine stirring was continued for 90 minutes at room temperature. Next, the reaction mixture was poured out on 1 l of water and 45 ml (0.5 mole) of concentrated hydrochloric acid at 50°-55° C. The dye was then filtered with suction, rinsed with 0.01 N hydrochloric acid at 50° C. After drying 11.5 g of dye (81%) were obtained. Absorption max.: 650 nm $-\epsilon = 1.13 \times 10^5$ in a solvent mixture of 1000 ml of dimethylsulfoxide and 1 ml of diethylamine.

Preparation 3: dye 3

122 g (2.4 mole) of hydrazine hydrate (93.6%) were added dropwise with stirring to a mixture of 500 ml of water and 320 g (2 mole) of pivaloyl acetic acid ethyl ester (98%). At the beginning of the addition the temperature was raised to 50° C. to start the reaction, after which the temperature rose spontaneously to 70° C. Stirring was continued for another hour and the mixture was left cooling overnight. Subsequently, the crystallized product was filtered with suction and recrystallized from isopropanol. After drying 130 g (47%) of 3-tert-butyl-2-pyrazolin-5-one melting at 205° C. were collected. Dye 3 was then prepared in the same way as dye 2 with an amount of 0.1 mole of this 2-pyrazolin-5-one derivative.

12 g (70%) of dye 3 were obtained. Absorption max.: 648 nm $-\epsilon = 4.51 \times 10^4$ in a solvent mixture of 1000 ml of dimethylsulfoxide and 2 ml of triethylamine were obtained.

According to a particular embodiment of the present invention the dye is used in an antihalation layer coated between the support and the light-sensitive silver halide emulsion layer(s) or at the side of the support opposite to that carrying the silver halide emulsion layer(s), of a photographic silver halide material e.g. a panchromatic film material for graphic arts use i.e. production of line and screen images including such materials for stabilization processing, details of which can be found e.g. in German patent application DE-OS 2,026,252 filed May 29, 1970 by Agfa-Gevaert A. G. and United Kingdom Pat. No. 1,243,180 filed Oct. 11, 1967 by Gevaert-Agfa N. V.

The dyes used according to this invention can be incorporated into the light-sensitive silver halide emulsion layer or the non-light-sensitive antihalation layer according to any technique known to those skilled in the art of dispersing water-insoluble compounds in hydrophilic colloid layers.

The dye can be incorporated into hydrophilic colloid compositions from solutions in water-miscible and/or water-immiscible solvents according to any of the dispersion techniques known for incorporating water-insoluble colour couplers in hydrophilic colloid media.

According to the present invention, a particularly suitable technique is to prepare a dispersion of the dye in an aqueous hydrophilic colloid composition by finely grinding the water-insoluble dye in a mill e.g. a ball mill, a sand mill, or a colloid mill in the presence of one or more dispersing agent(s). The hydrophilic colloid e.g. gelatin is added after or before the milling process. The dispersion obtained is then mixed with the coating composition. A layer containing the dispersed dye has a substantially uniform absorption over the whole region of the visible spectrum and is very stable, whereas the dispersed dye is non-migratory between pH 5 and 6.5. A layer that contains the dye before the processing shows no residual colour at all after the processing.

It is also possible to use the dyes in their salt form and to convert them in situ into their acid form e.g. by overcoating a gelatin layer containing the dissolved dyes in salt form with an acid gelatin layer so as to convert the dyes into their acid form.

For the purpose of increasing the absorption in a particular range of the spectrum, other known dyes can be used as well in addition to the dyes of the invention.

The colloids or mixtures of colloids used in the hydrophilic colloid compositions into which the dyes of the invention are dispersed, may be of any type as commonly used in photographic materials e.g. gelatin, casein, polyvinyl alcohol, poly-N-vinylpyrrolidone, carboxymethylcellulose or sodium alginate, gelatin being favoured however. Before the coating, other ingredients such as coating aids and hardening agents can be added to the dye dispersions. An antihalation layer, which is a surface layer of a photographic material e.g. a layer coated at the side of the support opposite to that carrying the silver halide emulsion layers can comprise antistatic agents and matting agents of the kind well known in the art. Such layers can comprise polymer latices of the type described in german patent application No. 2,800,466 filed Jan. 5, 1978 by Agfa-Gevaert A.

G., improving the mechanical and electrostatic properties of the layers. These polymer latices include latcies of 90-99 mole % of methyl acrylate and 1 to 10 mole % of polyfunctional crosslinking monomers e.g. tetraallyloxyethane and trivinylcyclohexane, the ester groups of which are at least partially saponified.

The following example illustrates the present invention.

EXAMPLE 2.25 g of bis-1,5-(3-methyl-2-pyrazolin-5-one)-pentamethine oxonol were mixed with 250 g of Ottawa sand, 0.225 g of sodium salt of oleylmethyltauride and a small amount of water to form a highly viscous paste. Ottawa sand is a trade name for standard sand 20/30 ASTM-designation G 190, marketed by Ottawa-silica Company, Ottawa, Illinois, USA. This mixture was ground for 4 h in a sand mill and then filtered through a glass filter. The sand on the filter was washed with water to remove the adsorbed dye from the sand particles.

The filtrate was adjusted to a volume of 450 ml and added to a solution of 75 g of gelatin in 975 ml of water with a temperature of 36° C.

The resulting gelatin dispersion was admixed with the necessary coating aids and applied to a film support such that 0.150 g of bis-1,5-(3-methyl-2-pyrazolin-5-one)-pentamethine oxonol and 5 g of gelatin were present per sq.m.

The dyed gelatin layer was coated with a gelatin antistress layer of 2 g of gelatin per sq.m.

In the FIGURE of the drawing absorption curves (density D/wavelength in nm) of the material of the example are given. Curves 1 and 2 are the absorption curves of the material as obtained before and after rinsing with demineralized water for 1 min. Curve 3 is the absorption curve of the material as obtained after a sequence of treatments corresponding to a black-and-white processing of exposed photographic material, which sequence comprises 20 s of development at 38° C., 10 s of rinsing, 20 s of fixing, 20 s of rinsing, and 10 s of drying.

We claim:

1. A photograhic light-sensitive material comprising a support and at least one light-sensitive silver halide emulsion layer wherein the emulsion layer or an antihalation layer coated on either side of the support comprises in dispersed state therein a 2-pyrazolin-5-one oxonol dye corresponding to the general formula:

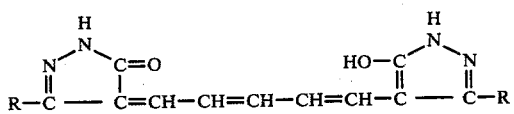

wherein R represents a $C_1$-$C_5$ alkyl group.

2. A material according to claim 1, wherein said dye is present in an antihalation layer between the support and the emulsion layer.

3. A material according to claim 1, wherein the substituent R of said dye is methyl, ethyl, or tert-butyl.

4. A material according to claim 2, wherein the substituent R of said dye is methyl, ethyl, or tert-butyl.

5. A material according to claim 1, wherein the emulsion layer has been sensitized panchromatically.

6. A material according to claim 2, wherein the emulsion layer has been sensitized panchromatically.

* * * * *